United States Patent
Agrawal et al.

(10) Patent No.: US 8,938,430 B2
(45) Date of Patent: Jan. 20, 2015

(54) INTELLIGENT DATA ARCHIVING

(75) Inventors: Sheshnarayan Agrawal, Karnataka (IN); Mukesh K. Mohania, Agra (IN)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 13/402,529

(22) Filed: Feb. 22, 2012

(65) Prior Publication Data

US 2013/0218843 A1    Aug. 22, 2013

(51) Int. Cl.
*G06F 17/30* (2006.01)

(52) U.S. Cl.
USPC ........................................ 707/662

(58) Field of Classification Search
CPC ................................. G06F 17/30073
USPC ........................................ 707/662
See application file for complete search history.

(56) References Cited

U.S. PATENT DOCUMENTS

| | | | |
|---|---|---|---|
| 6,078,933 A | 6/2000 | Szalwinski | |
| 6,240,427 B1 | 5/2001 | Szalwinski et al. | |
| 7,200,625 B2 | 4/2007 | Chiang et al. | |
| 7,260,590 B1 | 8/2007 | Williams | |
| 7,506,002 B2 | 3/2009 | Herbst et al. | |
| 7,653,663 B1 | 1/2010 | Wright et al. | |
| 8,041,907 B1* | 10/2011 | Wu et al. | 711/161 |
| 8,340,719 B1* | 12/2012 | Zands | 455/556.1 |
| 2002/0133369 A1* | 9/2002 | Johnson | 705/1 |
| 2005/0177460 A1* | 8/2005 | Salerno et al. | 705/27 |
| 2006/0117153 A1* | 6/2006 | Tran et al. | 711/159 |
| 2006/0129517 A1* | 6/2006 | Hillis | 707/1 |
| 2006/0136732 A1* | 6/2006 | Vandermolen | 713/178 |
| 2006/0149796 A1 | 7/2006 | Aalmink | |
| 2006/0167920 A1* | 7/2006 | Hankinson | 707/102 |
| 2007/0055687 A1* | 3/2007 | Josten et al. | 707/102 |
| 2007/0233683 A1* | 10/2007 | Verma et al. | 707/8 |
| 2007/0299890 A1 | 12/2007 | Boomer et al. | |
| 2008/0034014 A1* | 2/2008 | Beck et al. | 707/204 |
| 2008/0162590 A1 | 7/2008 | Kundu et al. | |
| 2009/0019003 A1 | 1/2009 | Bohannon et al. | |

(Continued)

FOREIGN PATENT DOCUMENTS

CN            102012850 A      4/2011

OTHER PUBLICATIONS

Gerard, Nicolas. "Oracle Database—Rowid Scans operation." <http://gerardnica.com/wiki/database/oracle/rowid_scans>. Downloaded Nov. 30, 2011. pp. 1-2.

(Continued)

*Primary Examiner* — Albert Phillips, III
(74) *Attorney, Agent, or Firm* — Mollborn Patents, Inc.; Fredrik Mollborn

(57) ABSTRACT

Methods and apparatus, including computer program products, implementing and using techniques for archiving an active record in a database. An auxiliary table is created in the database. The auxiliary table can store metadata information about active records to be archived and deleted from the database. An active record to be deleted from the database is selected. Metadata information is stored in the auxiliary table for the selected active record. The selected active record is archived into a data storage device. The selected active record is deleted from the database, based on the update information in the auxiliary table, without comparing column data for the archived record in the data storage device and the active record in the database prior to deletion of the active record from the database.

18 Claims, 3 Drawing Sheets

(56) References Cited

U.S. PATENT DOCUMENTS

| | | | |
|---|---|---|---|
| 2009/0089313 A1* | 4/2009 | Cooper et al. | 707/102 |
| 2009/0119354 A1* | 5/2009 | Stuart et al. | 707/206 |
| 2009/0327262 A1* | 12/2009 | Grack et al. | 707/5 |
| 2010/0030825 A1* | 2/2010 | Matsuzawa et al. | 707/204 |
| 2010/0211549 A1 | 8/2010 | Shetty et al. | |
| 2011/0178990 A1* | 7/2011 | Ohkawa | 707/662 |
| 2012/0047112 A1* | 2/2012 | Steffan | 707/662 |
| 2012/0102001 A1* | 4/2012 | Longshaw | 707/662 |

OTHER PUBLICATIONS

Lorentz, Diana and Joan Gregoire. "Oracle® Database. SQL Reference: 10g Release 1 (10.1) Part No. B10759-01." Oracle Corporation, Dec. 2003. pp. 1-1808.

PCT International Search Report. International Application No. PCT/CN2013/070089. Date of the actual completion of the international search Mar. 25, 2013. 10 pp.

* cited by examiner

INTELLIGENT DATA ARCHIVING

BACKGROUND

The present invention relates to data archiving, and more specifically, to archiving of data stored in databases. Data archiving refers to the process of moving data that is no longer actively used to a separate data storage device for long-term retention. Data archives typically consist of older data that is still important and necessary for future reference, as well as data that must be retained for regulatory compliance, audit trail purposes, or as a resource from which business insights can be derived based on the historical data. In general, data archives are indexed and have search capabilities so that files and parts of files can be easily located and retrieved.

Typically, database archiving works in three phases. First, records in a database, which are to be archive are fetched from the database and stored in a data archive. The fetching can typically be done using a SQL (Structured Query Language) query, such as a "SELECT" query. The retrieved records are archived in a suitable format onto some type of long-term storage media, such as a disk, tape, etc. Then, the archived records are verified to ensure their correctness, and finally the records are permanently deleted from the database once the verification is completed.

In conventional database archiving, two main approaches are used to delete archived records from the databases. The first approach is based on a complete data comparison model. That is, a one-to-one comparison between the archived data and the active (production) data in the database is made before the records are deleted from the database. The second approach is based on the idea of archiving database records based on partition data (when the archiving strategy is based on entire partitions of data) and then dropping the entire partition.

A drawback with these approaches is that the record comparison (with all attribute values) is expensive and computationally intensive, in part since the archived records must be fetched from the archive (i.e., the storage media/disk etc.) for comparison. In addition, no metadata is maintained when the records are updated after archival. Thus, there might be a possibility that someone updated a record, which has been archived and qualified for deletion. This causes the updated record in the database to be inconsistent with the archived copy of the same record, as no database related metadata is maintained. Thus, there is a need for improved techniques for archiving data.

SUMMARY

According to one embodiment of the present invention, methods and apparatus, including computer program products, are provided for archiving an active record in a database. An auxiliary table is created in the database. The auxiliary table can store metadata information about active records to be archived and deleted from the database. An active record to be deleted from the database is selected. Metadata information is stored in the auxiliary table for the selected active record. The selected active record is archived into a data storage device. The selected active record is deleted from the database, based on the update information in the auxiliary table, without comparing column data for the archived record in the data storage device and the active record in the database prior to deletion of the active record from the database.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

Figure 1:
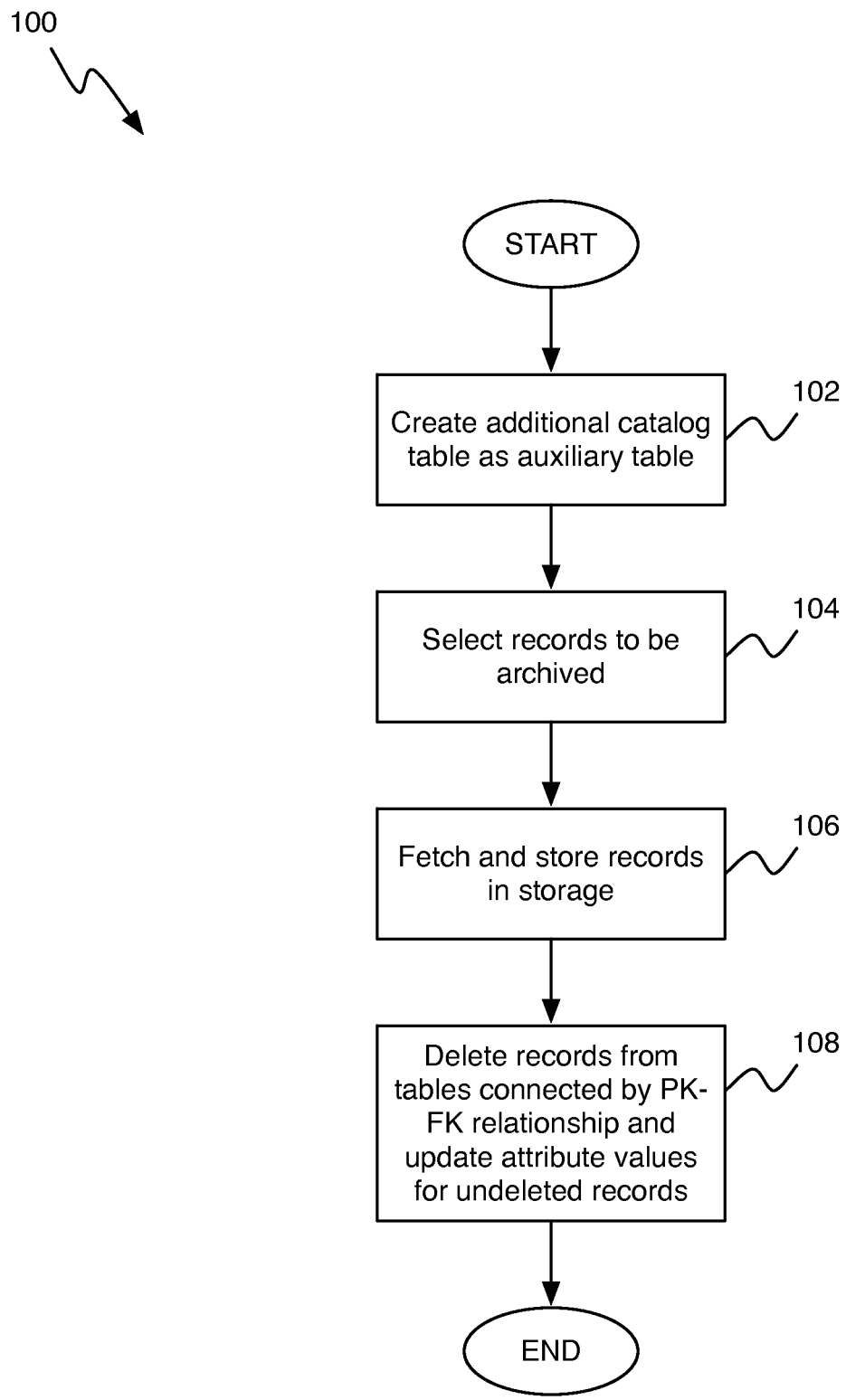
FIG. 1 is a flowchart showing a process (100) for intelligent data archiving in accordance with one embodiment.

The various embodiments of this invention provide techniques for archiving data, which will be described in detail below. In essence, by maintaining reference keys in an auxiliary table in the database catalog, "smart deletion" can be enabled without needing to compare archived records with original active records. Moreover, updates to archived records can be handled by tagging the reference key records in the auxiliary table, so that these records are not deleted. As a result of using these techniques, more efficient audit trails and report generation can be accomplished.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows a flowchart of a process (100) for intelligent data archiving in accordance with one embodiment. As can be seen in FIG. 1, the process (100) starts by creating an additional catalog table as an auxiliary table (step 102). For purposes of this example, the additional catalog table will be referred to as "DELETEON" and will have the schema (RowID, Table_Name, Update_Flag, Is_Delete_Sucessful). RowID indicates the archived record ID (by any primary key identifier). Table_Name indicates the table from which the record has been archived. Update_Flag is a flag whose value is set to '1' whenever the record with RowID is updated, but otherwise set to '0'. Is_Delete_Successful is a flag that is set to '0' when the record with RowID is not deleted, and set to '1' when the record is deleted.

Next, the records that are to be archived in the database are selected and the DELETEON table is updated by inserting a new tuple for each record to be archived (step 104). In one embodiment, there is a SELECT query syntax, which indicates that all the accessed records are qualified for future deletion. This SELECT query is executed by users when archiving of the records should occur. In one embodiment, the SELECT query has the following syntax:

SELECT * from <tab> where <predicates if any> with DELETEON;

Once executed, the above SELECT query marks each accessed record for deletion in the DELETEON catalog table. The RowIDs of all accessed records in each row are stored along with the Table_Name of the table on which the SELECT query was run.

Initially, the values of the Update_Flag are set to '0' and Is_Delete_Successful is set to '1' for the records. If a subsequent update occurs to a record with RowID, then the value of the Update_Flag for this record gets changed to '1'. In this way, it can be ensured that records that have been changed after the SELECT query was run are not deleted from the active database.

In some embodiments, a further table "List_of_Deleteon", is provided. The "List_of_Deleteon" table has a column "Table_Name", which is related by Primary Key-Foreign Key (PK-FK) to the "Table_Name" column of the DELETEON table.

If an UPDATE request is received to a record that has been marked for deletion, then the UPDATE request will set the Update_Flag column value for the record to '1'. The reason for changing the Update_Flag for the record in the DELETEON table (as opposed to simply deleting the entire record) is that the Update_Flag value can later be used to generate discrepancy reports between what has been archived and what has been deleted, as will be described in further detail below.

After the data has been selected with the SELECT statement, all selected rows are fetched and stored in a storage (step 106). Such storage can be, for example, various types of disks, tapes, etc., as is familiar to those of ordinary skill in the art.

Next, the selected records are deleted from all tables connected by the PK-FK relationship (step 108). In one embodiment, a new DELETE query with the following syntax is used for deleting records.

DELETE {ALL|<list of table names>} WITH DELETEON

Figure 2:
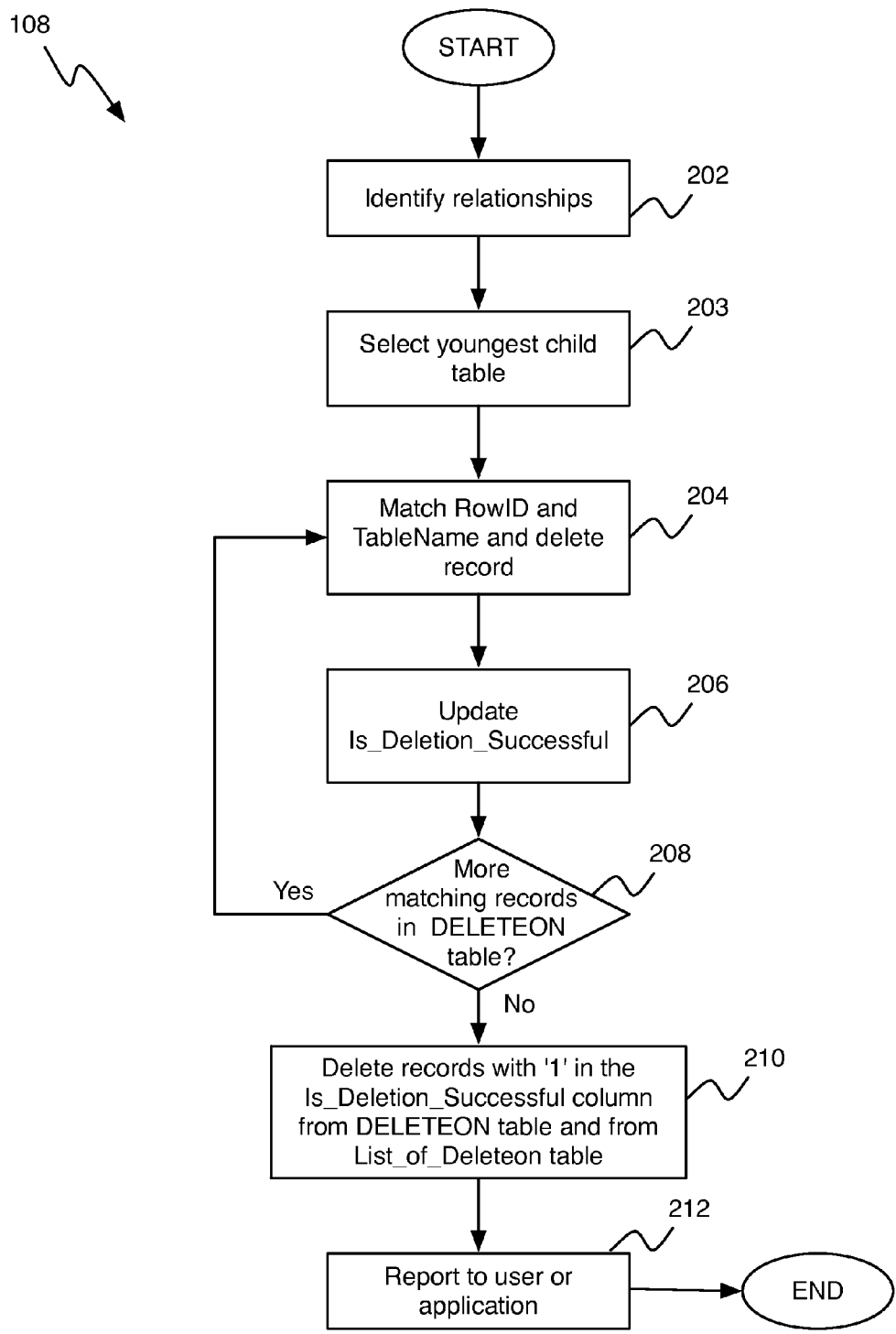
FIG. 2 is a flowchart showing a more detailed view of step (108) of FIG. 1, for deleting records from tables, in accordance with one embodiment.
Figure 3:
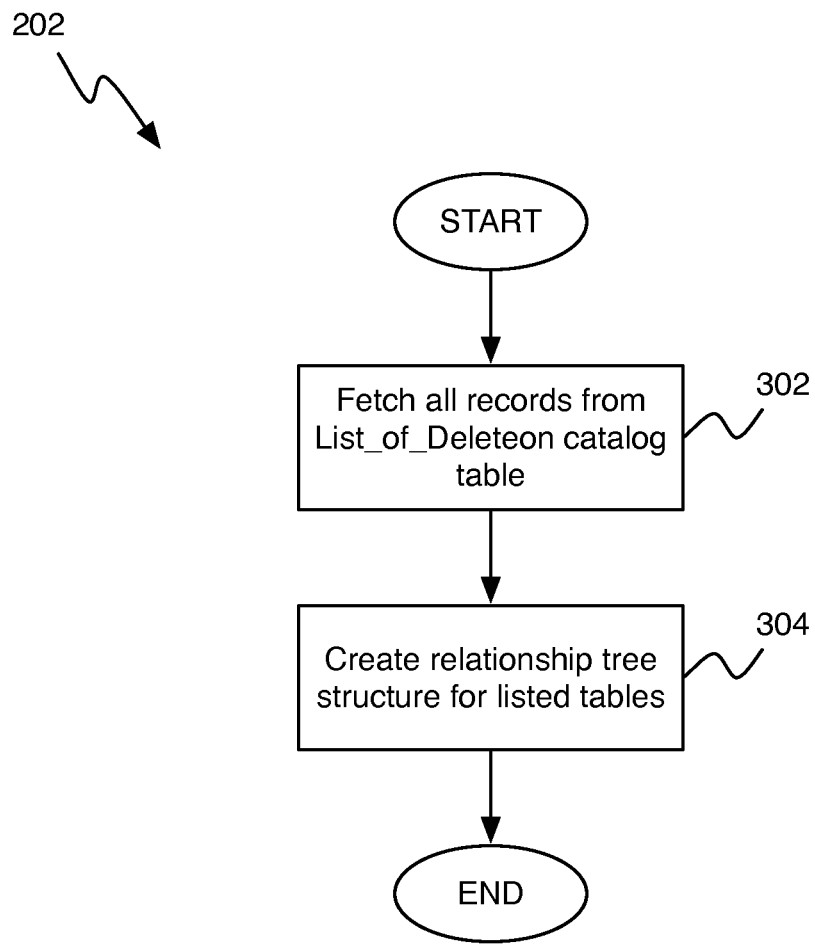
FIG. 3 is a flowchart showing a more detailed view of step (202) of FIG. 2, for identifying relationships between tables, in accordance with one embodiment.

When the DELETE query is executed, the DELETEON table will be referenced and those records marked for deletion (i.e., those with Update_Flag column value '0') will be deleted. The process for deleting records is described in further detail with respect to FIGS. 2 and 3. As can be seen in FIG. 2, the process (108) starts with identifying the relationships (if any) among tables (step 202). FIG. 3 shows one embodiment of this step in further detail and will now be described.

As can be seen in FIG. 3, the process (202) for identifying relationships starts by fetching all the records in the single column from the List_of_Deleteon catalog table (step 302), i.e., the names of all tables having records that are to be deleted. Next, a relationship tree is created for these tables, which identifies parent-child relationships for the tables (step 304). In one embodiment, existing database catalog tables, which store information about relationships for each of the tables in the List_of_Deleteon tables, are used to build this relationship tree. This concludes step 203.

Returning now to FIG. 2, the lowest level child in the relationship tree is selected, that is, the table that does not have any related child tables itself (step 203). The RowID and Table_Name values are then matched and the record is deleted from the List_of_Deleteon table (step 204). Next, the Is_Delete_Successful column in the DELETEON table is marked as "1" (step 206). If for some reason the deletion of the particular record was not successful, the Is_Delete_Successful column for the record will be updated to "0" for all the related tables' records, in order to ensure integrity.

Next, the process checks whether there are any further tables in the relationship that have matching records in the DELETEON table (step 208). If there are further tables with matching records in the DELETON table, then the process returns to step 204 and continues as described above. If there are no further tables with matching records in the DELETEON table, then the process proceeds with deleting records from the DELETEON table itself based on the value in the Is_Delete_Successful column (step 210). If the value in the Is_Delete_Successful column is "1", then the record is deleted from the DELETEON table. If the value in the Is_Delete_Successful column is "0", then the record is kept, as these records have not been deleted from the database. Records from the List_of_Deleteon catalog table are deleted in a similar fashion. Finally, the user (or application) that initiated the DELETE query is presented with a report indicating the success or failure of the DELETE query (step 212), which ends the process (i.e., step 108 of FIG. 1).

As the skilled person realizes, there are many advantages that can be realized with the above-described embodiments. For example, the RowID of a row specifies the data file and data block containing the row and the location of the row in that block. Locating a row by specifying its RowID is the fastest way to retrieve a single row, since the exact location of the row in the database is specified. Furthermore, the RowID scan is an access path used by the query optimizer to produce the best query execution plan.

Yet further advantages include the fact that there is no need to maintain any metadata information outside of the database. The number of disk accesses is reduced, which leads to a reduction in I/O costs. There is no need for comparing records, which further significantly reduces the computation cost. Records are deleted by referring to a catalog table, i.e., no external metadata is needed. By tagging each row in the DELETON table, it is easy to determine whether records have been updated or not. The auxiliary information can be helpful in audit trails and business intelligence applications.

As mentioned above, in one embodiment the DELETEON table can also be used to generate discrepancy reports between what data has been archived and what data has been deleted from the database. By examining the "Is_Delete_Successful" column of the DELETEON table, after successfully executing the "DELETE {ALL|<list of table names>} WITH DELETEON" SQL query, the DELETEON table can be examined to check whether there are any records still left with "Is_Delete_Successful" column value set to "0". Based on these values, a report can be created (mainly by executing certain SQL commands) which lists all the records that were not deleted.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer-implemented method for archiving an active record in a database, the method comprising:
creating an auxiliary table in the database, the auxiliary table being operable to store metadata information about active records to be archived and deleted from the database;
selecting an active record to be deleted from the database;
storing metadata information for the selected active record in the auxiliary table;
archiving the selected active record into a data storage device; and
deleting the selected active record from the database, based on update information in the auxiliary table, without comparing column data for the archived record in the data storage device and the active record in the database prior to deletion of the active record from the database.

2. The method of claim 1, further comprising:
in response to receiving an update to the active record after the record has been archived into the data storage device, capturing the metadata information for the record in the auxiliary table to reflect that the active record has been updated.

3. The method of claim 2, wherein deleting the selected active record comprises:
deleting the active record from the database in response to determining that an update value for the record in the auxiliary table indicates that no updates have been made to the active record after the active record was archived.

4. The method of claim 1, further comprising:
deleting active records related to the selected record from tables that are connected by a primary key-foreign key relationship to the table in which the selected record is stored.

5. The method of claim 1, wherein the auxiliary table has the schema (RowID, Table_Name, Update_Flag, Is_Delete_Successful), where RowID is a primary key identifier of the active record, Table_Name indicates the table in the database in which the active record is stored, Update_Flag indicates whether the active record has been updated after archiving, and Is_Delete_Successful indicates whether the record has been successfully deleted from the database.

6. The method of claim 1, further comprising:
generating a report based on the information in the auxiliary table, the report indicating whether any discrepancies exist between what data has been archived in the data storage device and what data has been deleted from the database.

7. A computer program product for archiving an active record in a database, the computer program product comprising:
a non-transitory computer readable storage medium having computer readable program code embodied therewith, the computer readable program code comprising:
computer readable program code configured to create an auxiliary table in the database, the auxiliary table being operable to store metadata information about active records to be archived and deleted from the database;
computer readable program code configured to select an active record to be deleted from the database;
computer readable program code configured to store metadata information for the selected active record in the auxiliary table;
computer readable program code configured to archive the selected active record into a data storage device; and
computer readable program code configured to delete the selected active record from the database, based on update information in the auxiliary table, without comparing column data for the archived record in the data storage device and the active record in the database prior to deletion of the active record from the database.

8. The computer program product of claim 7, further comprising:
computer readable program code configured to, in response to receiving an update to the active record after the record has been archived into the data storage device, capture the metadata information for the record in the auxiliary table to reflect that the active record has been updated.

9. The computer program product of claim 8, wherein the computer readable program code configured to delete the selected active record comprises:
computer readable program code configured to delete the active record from the database in response to determining that an update value for the record in the auxiliary table indicates that no updates have been made to the active record after the active record was archived.

10. The computer program product of claim 7, further comprising:
computer readable program code configured to delete active records related to the selected record from tables that are connected by a primary key-foreign key relationship to the table in which the selected record is stored.

11. The computer program product of claim 7, wherein the auxiliary table has the schema (RowID, Table_Name, Update_Flag, Is_Delete_Successful), where RowID is a primary key identifier of the active record, Table_Name indicates the table in the database in which the active record is stored, Update_Flag indicates whether the active record has been updated after archiving, and Is_Delete_Successful indicates whether the record has been successfully deleted from the database.

12. The computer program product of claim 7, further comprising:
computer readable program code configured to generate a report based on the information in the auxiliary table, the report indicating whether any discrepancies exist between what data has been archived in the data storage device and what data has been deleted from the database.

13. A system for archiving an active record in a database, the system comprising:
a data storage device operable to archive active records obtained from a database for long-term storage;
a computing device hosting a database with active records, the computing device including a processor and a memory storing instructions operable to cause the processor to perform the following operations:
creating an auxiliary table in the database, the auxiliary table being operable to store metadata information about active records to be archived and deleted from the database;
selecting an active record to be deleted from the database;
storing metadata information for the selected active record in the auxiliary table;
archiving the selected active record into the data storage device; and
deleting the selected active record from the database, based on update information in the auxiliary table, without comparing column data for the archived record in the data storage device and the active record in the database prior to deletion of the active record from the database.

14. The system of claim 13, wherein the memory stores instructions operable to cause the processor to perform the following operation:
in response to receiving an update to the active record after the record has been archived into the data storage device, capturing the metadata information for the record in the auxiliary table to reflect that the active record has been updated.

15. The system of claim 14, wherein deleting the selected active record comprises:
deleting the active record from the database in response to determining that an update value for the record in the auxiliary table indicates that no updates have been made to the active record after the active record was archived.

16. The system of claim 13, wherein the memory stores instructions operable to cause the processor to perform the following operation:
deleting active records related to the selected record from tables that are connected by a primary key-foreign key relationship to the table in which the selected record is stored.

17. The system of claim 13, wherein the auxiliary table has the schema (RowID, Table_Name, Update_Flag, Is_Delete_Successful), where RowID is a primary key identifier of the active record, Table_Name indicates the table in the database in which the active record is stored, Update_Flag indicates whether the active record has been updated after archiving, and Is_Delete_Successful indicates whether the record has been successfully deleted from the database.

18. The system of claim 13, wherein the memory stores instructions operable to cause the processor to perform the following operation:
  generating a report based on the information in the auxiliary table, the report indicating whether any discrepancies exist between what data has been archived in the data storage device and what data has been deleted from the database.

* * * * *